United States Patent [19]

Huang

[11] Patent Number: 5,519,733

[45] Date of Patent: May 21, 1996

[54] METHOD AND APPARATUS FOR RECOVERING A QAM CARRIER

[75] Inventor: Zheng Huang, Willow Grove, Pa.

[73] Assignee: General Instrument Corporation of Delaware, Chicago, Ill.

[21] Appl. No.: 238,316

[22] Filed: May 5, 1994

[51] Int. Cl.⁶ .............................. H04L 27/22; H04L 27/06
[52] U.S. Cl. ............................................. 375/326; 375/344
[58] Field of Search ..................................... 375/326, 327, 375/324, 340, 341, 261, 344; 455/119, 260

[56] References Cited

U.S. PATENT DOCUMENTS

| | | | |
|---|---|---|---|
| 4,587,498 | 5/1986 | Bonnerot et al. | 375/326 |
| 4,958,360 | 9/1980 | Sari | 375/344 |

FOREIGN PATENT DOCUMENTS

| | | |
|---|---|---|
| 4216156 | 8/1993 | Germany . |

OTHER PUBLICATIONS

Patent Abstract of Japan, vol. 16, No. 465 (E-1270), Sep. 28, 1992, JP-A-04 165737, published Jun. 11, 1992.

A. Leclert, et al., "Universal Carrier Recovery Loop for QASK and PSK Signal Sets," *IEEE Transactions on Communications*, vol. COM-31, No. 1, Jan, 1983, pp. 130-136.

Sari, et al., "New Phase and Frequency Detectors for Carrier Recovery in PSK and QAM Systems," *IEEE Transactions on Communications*, vol. 36, No. 9, Sep. 1988, pp. 1035-1043.

Godard, "Self-Recovering Equalization and Carrier Tracking in Two-Dimensional Data Communication Systems," *IEEE Transactions on Communications*, vol. COM-28, No. 11, Nov. 1980, pp. 1867-1875.

*Primary Examiner*—Stephen Chin
*Assistant Examiner*—Hai H. Phan
*Attorney, Agent, or Firm*—B. R. Lipsitz; R. F. Hoppin

[57] ABSTRACT

A method and apparatus are provided for recovering and tracking the carrier in a QAM communication system, even under heavy interference conditions. A subset of fixed points is defined on an ideal constellation pattern for comparison to the data points in a received signal. The subset includes all of the points intersected by n radii (e.g., the four diagonals) of the constellation pattern. Additional points along the perimeter of the constellation pattern can also be provided in the subset. Data points received via a carrier are correlated with the fixed points of the subset in order to generate an error signal indicative of a phase difference between the fixed points of the subset and the received data points correlated therewith.

8 Claims, 3 Drawing Sheets

METHOD AND APPARATUS FOR RECOVERING A QAM CARRIER

BACKGROUND OF THE INVENTION

The present invention relates to digital communications, and more particularly to a carrier recovery scheme for quadrature amplitude modulated (QAM) systems.

In order to communicate digital data via an analog channel, the data is modulated using, for example, a form of pulse amplitude modulation (PAM). Typically, quadrature amplitude modulation is used to increase the amount of data that can be transmitted within an available channel bandwidth. QAM is a form of PAM in which a plurality of bits of information are transmitted together in a pattern referred to as a "constellation," which can contain, for example, 16, 32, or 64 points, etc.

In pulse amplitude modulation, each signal is a pulse whose amplitude level is determined by a transmitted symbol. In 16-QAM, symbol amplitudes of −3, −1, 1 and 3 in each quadrature channel are typically used. In 64-QAM, symbol amplitudes of −7, −5, −3, −1, 1, 3, 5 and 7 are typically used in each quadrature channel.

A phase lock loop (PLL) is a common and well known method used to recover the carrier in signal demodulators. When used in such applications, the PLL is sometimes referred to as a carrier recovery loop (CRL). A free running oscillator is used to translate the input signal frequency to baseband, and a phase rotator may be used to recover the carrier phase. Examples of known carrier recovery loops can be found in A. Leclert and P. VanDamme, "Universal Carrier Recovery Loop for QASK and PSK Signal Sets," IEEE Transactions on Communications, Vol. Com-31 No.1, January 1983, pp. 130–136; H. Sari and S. Moridi, "New Phase and Frequency Detectors for Carrier Recovery in PSK and QAM systems," IEEE Transactions on Communications, Vol. 36, No. 9, September 1988, pp. 1035–1043; and U.S. Pat. No. 4,958,360 to H. Sari, entitled "Circuit for Recovering the Carrier in Digital Transmission Systems."

In the '360 patent, carrier recovery is accomplished using apparatus that selects received signal points with the aid of selection zones formed by ring segments situated around certain states of the signal constellation. The signals of the in-phase (I) and quadrature (Q) channels are used to address a memory that contains the information belonging to or not belonging to the signal point received in one of the selected zones as well as the amplitude and the error sign that relate thereto. An important feature of the system disclosed in the '360 patent is that the received signal points are selected with the aid of zones situated around only certain states of the signal constellation. The intent is to cancel all of the received signal points liable to cause a faulty acquisition and to use only those points that are liable to cause a correct acquisition. More specifically, in the 64-QAM embodiment illustrated in the '360 patent, the selection zones for the (+,+) quadrant are limited to areas within rings around diagonal states (1,1), (3,3), and (7,7). Equivalent selection zones are used in the remaining quadrants of the constellation.

A problem with the system provided in the '360 patent is that the gain of the system must be extremely accurate in order to effect carrier recovery. If the gain is not as expected, the received points may be outside of the defined selection zones and it will be impossible to acquire the signal. Thus, any kind of interference that can affect gain, such as echoes that can occur in terrestrial and cable television transmission, can render the system unusable.

It would be advantageous to provide a method and apparatus for tracking a digitally modulated signal during the carrier recovery process that is not affected by changes in the amplitude of the received signal, or the gain within the communication channel or the receiver itself. Such a system should be able to lock onto the carrier even under heavy interference and other detrimental effects, such as noise, echoes, irregular system gain and frequency drift.

The present invention provides a method and apparatus having the aforementioned advantages.

SUMMARY OF THE INVENTION

In accordance with the present invention, a method is provided for recovering a digitally modulated carrier on which data is carried as points approximating fixed points of a constellation pattern symmetrically located about the origin of perpendicular X and Y axes. A subset of no more than about 75% of the fixed points on the constellation pattern is defined. The subset includes all of the points intersected by n radii extending from the origin. Each radius forms an angle of 360°/n with both adjacent radii. Data points received via the carrier are correlated with the fixed points of the subset. An error signal is generated indicative of a phase difference between the fixed points of the subset and the received data points correlated therewith. The error signal is used as feedback to track the phase difference for recovering the carrier.

In an illustrated embodiment, the constellation pattern comprises an N×N square of points, and the subset includes the points forming the perimeter of the square. Four radii (n=4) are used, and extend along the diagonals of the square. The constellation can comprise, for example, a 64-QAM constellation, such that the subset includes 40 points of the 64-QAM constellation symmetrically located about the origin of the perpendicular X and Y axes.

Apparatus is provided for recovering a digitally modulated carrier on which data is carried as points approximating fixed points of a constellation pattern symmetrically located about the origin of perpendicular X and Y axes. A phase lock loop has an input coupled to receive the carrier and is responsive to a phase error signal for recovering the carrier. The phase error signal is indicative of a phase difference between data points received via the carrier and the fixed points of the constellation pattern. A phase detector is provided within the phase lock loop for determining the phase error by comparing the received data points to a subset of no more than about 75% of the fixed points on the constellation pattern. The subset includes all of the points intersected by n (e.g., four) radii extending from the origin, each radius forming an angle of 360°/n with both adjacent radii.

DETAILED DESCRIPTION OF THE INVENTION

In a digital communication system, a carrier recovery loop regenerates the carrier which tracks the phase of a received digital signal. Traditional carrier recovery, such as that based on the "direct decision algorithm" (DDA) is sensitive to many factors. These include noise, interference, echoes, system gain, and frequency drift. As a result of such factors, known carrier recovery methods are not particularly robust, and the error signal is not generally evaluated until after an adaptive equalizer that compensates for such factors. The coupling of the carrier recovery loop with the adaptive equalizer complicates the receiver system, since the phase locking of the carrier recovery loop and the convergence of the adaptive equalizer are interrelated. The use of an adaptive equalizer also introduces some delay into the carrier recovery loop, thereby degrading the tracking capability of the loop.

Figure 1:
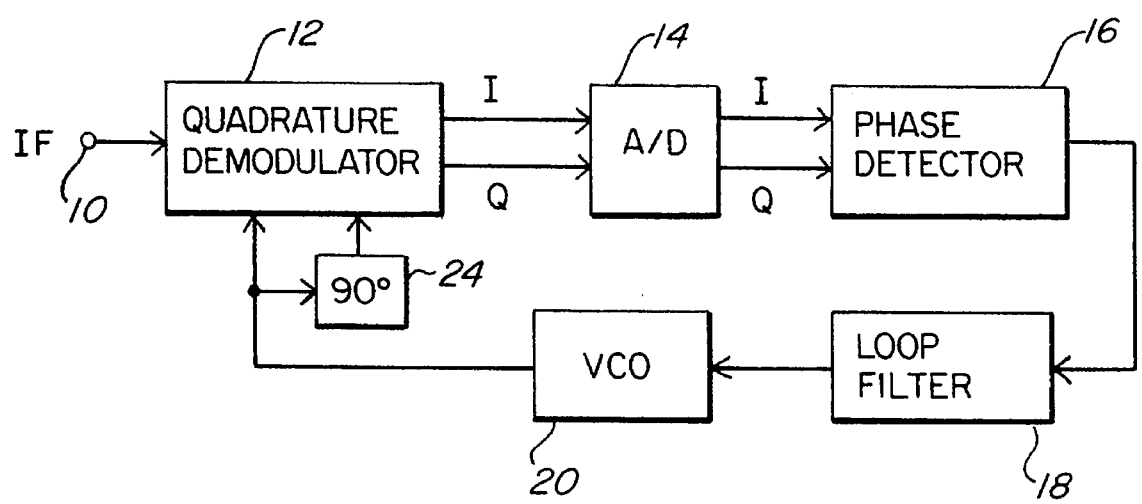
FIG. 1 is a block diagram of apparatus including a phase detector in accordance with the present invention.

The present invention provides a carrier recovery loop that is decoupled from the adaptive equalizer. Such a loop is illustrated in FIG. 1. An intermediate frequency (IF) signal introduced at terminal 10 is demodulated by a conventional quadrature demodulator 12. The demodulator outputs the in-phase (I) and quadrature (Q) components of the received signal, which are converted from analog to digital form by an analog to digital (A/D) converter 14. The digitized I and Q components are then input to a phase detector 16 which compares the phase of the received data, represented as a constellation pattern, to the phase of an ideal constellation pattern which is, for example, stored in a read only memory provided in phase detector 16. An error signal representative of the difference in phase between the received signal points and the ideal constellation pattern is output from phase detector 16, filtered by a loop filter 18, and used to control a voltage controlled oscillator (VCO) 20. The VCO output is input to the quadrature demodulator 12 in order to adjust the phase of the received signal points so that they can be matched to corresponding points on the ideal constellation pattern for detection by phase detector 16. The quadrature demodulator 12 receives both the VCO output and a 90° shifted version thereof (via phase shifter 24) in accordance with conventional quadrature demodulation techniques.

Although the general structure of the carrier recovery loop illustrated in FIG. 1 is conventional, the phase detector 16 has been modified in accordance with the present invention. Specifically, the comparison of received signal points to the ideal constellation pattern is not made on the basis of the entire constellation pattern, nor is it made on the basis of selection zones forming ring segments as disclosed in the aforementioned U.S. Pat. No. 4,958,360. Instead, the incoming signal points are compared to a subset of the ideal constellation points as illustrated in FIG. 2.

Figure 2:
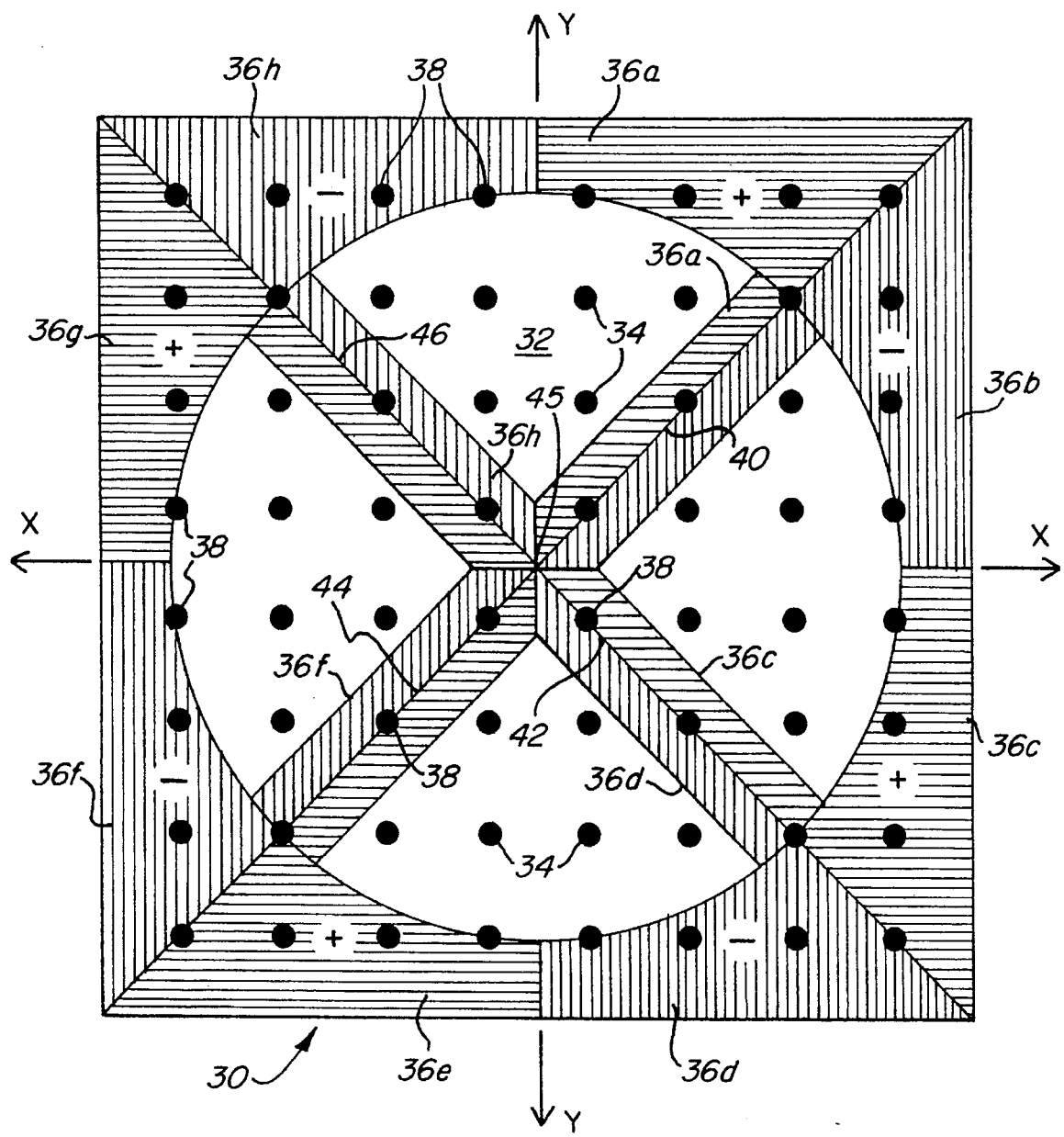
FIG. 2 is a diagrammatic illustration of a 64-QAM constellation pattern indicating various subsets of points on which carrier recovery is based in accordance with the present invention.

The ideal constellation pattern 30 illustrated in FIG. 2 is used in connection with a 64-QAM embodiment of the present invention. It should be appreciated that although a 64-QAM embodiment is illustrated, the invention is applicable to other orders of QAM such as 32-QAM, 256-QAM, etc. In accordance with the invention, received QAM signal points are compared only to the points lying within the shaded areas of the ideal constellation of FIG. 2. These points are designated by reference numerals 38. The points 34 in the unshaded areas 32 are not used by phase detector 16 in generating the error signal output therefrom. Thus, in one possible implementation, the unused points 34 of a received constellation can result in the output of a binary zero, while the used points 38 can result in the output of a "+" or "−" signal depending on what their phase is with respect to the ideal constellation. Alternatively, the error signals for the used points 38 can be actual values, or outputs from a tri-state buffer, where a first state represents a "+", a second state represents a "−", and the third state represents an unused point 34.

The subset of points 38 illustrated in FIG. 2 includes all of the points intersected by four radii 40, 42, 44 and 46. Each of these radii forms a 90° angle with both adjacent radii. In the embodiment shown, these radii each form a 45° angle with the adjacent X and Y axis.

In a preferred embodiment, where the constellation pattern comprises an N×N square of points, the subset of points used by phase detector 16 also includes those points forming the perimeter of the N×N square that all not intersected by the radii 40, 42, 44 and 46. From FIG. 2, it can be seen that in the preferred embodiment, the subset of points considered by phase detector 16 includes 40 points of the constellation. The 24 points residing in the unshaded areas 32 are not considered.

FIG. 2 depicts eight different shaded portions 36a to 36h. Portions 36a, 36c, 36e and 36g are marked with the notation "+" to designate that when the received points are shifted counterclockwise with respect to the ideal constellation pattern stored in phase detector 16, the received points must be rotated clockwise to form a proper alignment with the ideal constellation pattern. Shaded areas 36b, 36d, 36f and 36h contain the notation "−" to designate that when the received points are rotated clockwise with respect to the ideal constellation pattern, the received constellation must be rotated counterclockwise to properly align with the ideal constellation pattern.

Figure 3:
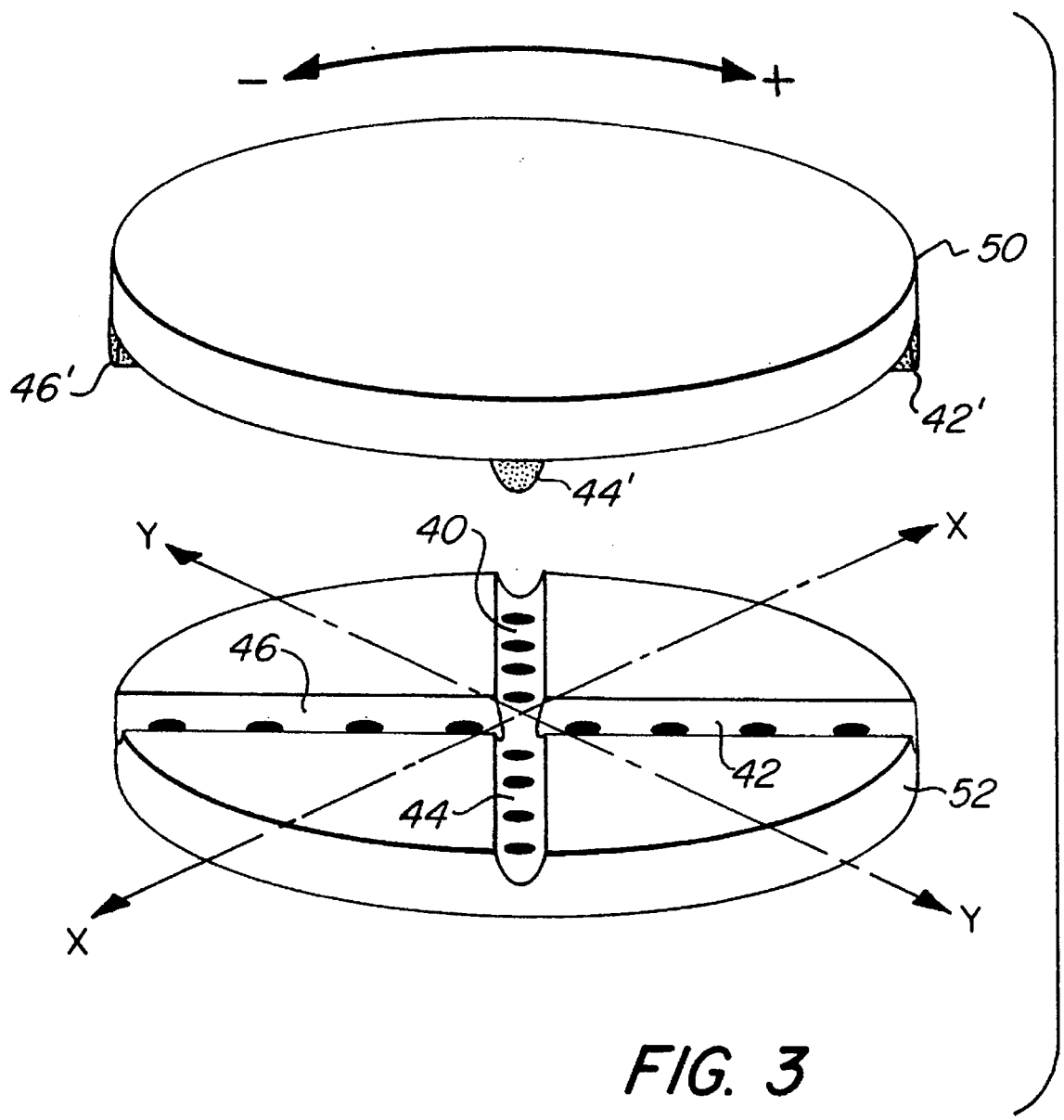
FIG. 3 is a diagrammatic illustration for purposes of explaining the signal point correlation function of the present invention.

The operation of the phase detector 16 in accordance with the present can be understood by referring to FIG. 3, which is provided for purposes of explanation only. FIG. 3 illustrates in conceptual form a received constellation 50 having data points generally along radii 42', 44', and 46'. Points will also be present generally along a radius 40' which is not visible in the perspective view of FIG. 3.

The ideal constellation stored in phase detector 16 can be conceptualized as shown at 52. In order to achieve a carrier lock condition, the received constellation 50 is rotated in either the clockwise (+) or counterclockwise (−) direction, so that the radii 40', 42', 44' and 46' line up with the respective radii 40, 42, 44 and 46 of the ideal constellation pattern 52. When this occurs, the received constellation 50 will be able to mate with the ideal constellation 52, at which point a carrier lock condition has been achieved.

Since the subset of points of the ideal constellation which phase detector 16 compares to the received constellation includes all of the points along the radii 40, 42, 44 and 46, the carrier recovery scheme of the present invention is unaffected by variations in gain of the received signal and/or the gain of the carrier loop. Thus, carrier lock can be achieved over a very large range. Carrier lock is achieved even under heavy interference introduced in the communication path. The carrier recovery scheme of the present invention is also fairly insensitive to variations in the automatic gain control (AGC) circuitry of the receiver. Thus, the need for precision gain adjustments at the receiver is avoided.

Test results have shown that a carrier recovery loop using the subset of points illustrated in FIG. 2 can directly lock under conditions in which there is −8 dB echo, 200 KHz frequency drift and −20 dB I-Q crosstalk without the need for frequency scanning. Such performance enables the carrier recovery loop to be decoupled from the adaptive equalizer, simplifying system design. Tracking is improved, thereby relaxing the phase noise requirement of the carrier recovery system. The resultant receiver is more robust to noise and interference in the communication channel and more frequency drift is tolerated than in prior art designs.

It should now be appreciated that present invention provides a method and apparatus for recovering and tracking a digitally modulated carrier on which data is carried as points approximating fixed points of a constellation pattern. Although a 64-QAM embodiment has been discussed herein for purposes of explanation, other orders of QAM will also benefit from the present invention. At a minimum, the points along selected radii (e.g., the diagonals of the constellation pattern) are used by the phase detector of the carrier recovery loop during the carrier recovery and tracking process. Additional points along the perimeter of the QAM constellation can also be included in the subset of points considered by the phase detector. In the preferred embodiment, the phase detector maintains a lookup table with the subset of points used to recover and track the incoming carrier. The template formed by the lookup table enables an error signal to be generated until an exact match (i.e., carrier lock) is achieved.

Although the invention has been described in connection with a specific embodiment thereof, those skilled in the art will appreciate that various adaptations and modifications may be made thereto without departing from the spirit and scope of the invention as set forth in the claims.

What is claimed:

1. A method for recovering a digitally modulated carrier on which data is carried as points approximating fixed points of a constellation pattern symmetrically located about the origin of perpendicular X and Y axes, comprising the steps of:

defining a subset of no more than about 75% of the fixed points on said constellation pattern wherein said constellation pattern comprises an N×N square of points, said subset including all of the points intersected by n radii extending from said origin and the points forming the perimeter of said square but not intersected by said radii extending from said origin, each radius forming an angle of 360°/n with both adjacent radii;

correlating data points received via said carrier with the fixed points of said subset;

generating an error signal indicative of a phase difference between the fixed points of said subset and the received data points correlated therewith; and using said error signal as feedback to track said phase difference for recovering said carrier.

2. A method in accordance with claim 1 wherein n=4 and said four radii extend along the diagonals of said square.

3. A method in accordance with claim 1 wherein said constellation is a 64-QAM constellation.

4. A method in accordance with claim 3 wherein n=4 and said four radii extend along the diagonals of said square, such that said subset includes forty points of said 64-QAM constellation symmetrically located about said origin.

5. Apparatus for recovering a digitally modulated carrier on which data is carried as points approximating fixed points of a constellation pattern symmetrically located about the origin of perpendicular X and Y axes, comprising:

a phase lock loop having an input coupled to receive said carrier and responsive to a phase error signal for tracking said carrier, said phase error signal being indicative of a phase difference between data points received via said carrier and the fixed points of said constellation pattern; and a phase detector within said phase lock loop for determining said phase difference by comparing the received data points to a subset of no more than about 75% of the fixed points on said constellation pattern wherein said constellation pattern comprises an N×N square of points, said subset including all of the points intersected by n radii extending from said origin, and the points forming the perimeter of said square but not intersected by said radii extending from said origin each radius forming an angle of 360°/n with both adjacent radii.

6. Apparatus in accordance with claim 5 wherein n=4 and said four radii extend along the diagonals of said square.

7. Apparatus in accordance with claim 5 wherein said constellation is a 64-QAM constellation.

8. Apparatus in accordance with claim 7 wherein n=4 and said four radii extend along the diagonals of said square, such that said subset includes forty points of said 64-QAM constellation symmetrically located about said origin.

\* \* \* \* \*